United States Patent
Bortoli

(10) Patent No.: US 7,967,343 B2
(45) Date of Patent: Jun. 28, 2011

(54) ADAPTER FOR CLAMPS, PARTICULARLY FOR WELDING PLASTIC PIPES

(75) Inventor: Renzo Bortoli, Padua (IT)

(73) Assignee: Ritmo S.p.A., Teolo (Padova) (IT)

( * ) Notice: Subject to any disclaimer, the term of this patent is extended or adjusted under 35 U.S.C. 154(b) by 943 days.

(21) Appl. No.: 11/810,945

(22) Filed: Jun. 7, 2007

(65) Prior Publication Data

US 2008/0048450 A1    Feb. 28, 2008

(30) Foreign Application Priority Data

Jun. 20, 2006  (IT) .............. PD2006A0254

(51) Int. Cl.
*F16L 23/00*    (2006.01)

(52) U.S. Cl. .......... 285/411; 285/12; 285/408; 285/415; 285/420; 269/287

(58) Field of Classification Search .......... 285/420, 285/414, 415, 408, 409, 410, 411, 12, 288.5, 285/289.2, 148.23, 19, 287, 21.1; 269/95, 269/6, 3, 287; 29/235
See application file for complete search history.

(56) References Cited

U.S. PATENT DOCUMENTS

| | | | | |
|---|---|---|---|---|
| 1,784,667 A * | 12/1930 | Gillet | | 285/415 |
| 2,911,239 A * | 11/1959 | Marzolf, Sr. | | 285/415 |
| 3,152,816 A * | 10/1964 | Smith | | |
| 4,519,639 A * | 5/1985 | Florian | | 285/415 |
| 4,741,722 A * | 5/1988 | Federn | | |
| 4,989,443 A * | 2/1991 | Sawdon | | |
| 5,118,139 A * | 6/1992 | Lott | | 285/15 |
| 5,257,525 A * | 11/1993 | Clarke | | |
| 5,666,711 A * | 9/1997 | Pfeiffer | | |
| 5,890,270 A * | 4/1999 | Oetiker | | 29/235 |
| 6,079,753 A * | 6/2000 | Erwin | | 285/415 |
| 6,499,773 B1 * | 12/2002 | Ostergaard | | 285/408 |
| 6,499,774 B1 * | 12/2002 | Smith | | 285/411 |
| 7,043,806 B2 * | 5/2006 | Schrock et al. | | |

* cited by examiner

*Primary Examiner* — David E Bochna
(74) *Attorney, Agent, or Firm* — R. Nell Sudol; Henry D. Coleman; William J. Sapone

(57) ABSTRACT

An adapter for pipe locking clamps, particularly but not exclusively useful for welding portions of plastic piping by polyfusion. The adapter has at least two bodies obtained from a metal plate, and arranged parallel to each other. The bodies have respective circular arc-like lateral rims that have a same radius of curvature. The centers of curvature of the circular arc-like lateral rims are all arranged on a same axis so as to form a partially cylindrical concave surface forming an open cradle which is adapted to lock the pipes in cooperation with a similar surface formed on a complementary and opposite reduction unit.

14 Claims, 4 Drawing Sheets

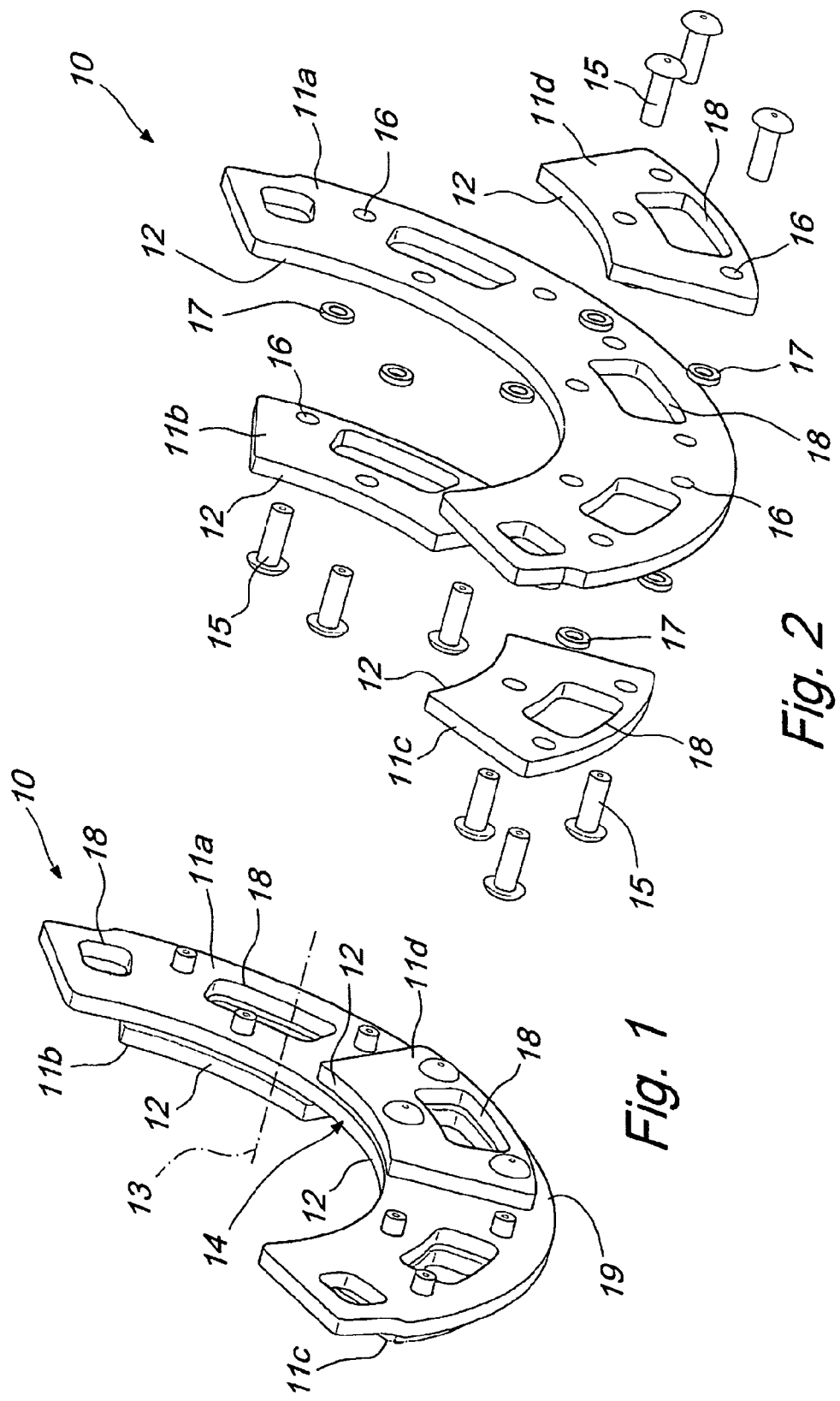

ADAPTER FOR CLAMPS, PARTICULARLY FOR WELDING PLASTIC PIPES

BACKGROUND OF THE INVENTION

1. Field of the Invention

The present invention relates to an adapter for clamps, particularly for welding plastic pipes.

2. Description of the Prior Art

Plastic pipings for conveying fluids are made by butt-welding pieces of pipes, tees, bends, etc. Among the various technologies known to perform the welding, one of the most widely used is polyfusion of the head portion.

Special welding machines are used to perform this type of welding.

The specific welding machines will not be described herein, it may be known however that the pipes, tees, bends, etc. that compose the piping, in order to be welded together, must have the same diameter and thickness and must be axially mutually aligned during welding.

Particularly, in the case of welding of pipes for fluids under pressure and in any case for pipes that have a substantial thickness, the welding machines have a supporting frame on which four aligned clamps are mounted and lock the head portions of the pipes to be welded in pairs. Two mutually opposite hydraulic pusher cylinders are associated with the clamps and allow the movement of the clamps so as to bring into contact the heads of the pipes to be welded.

The clamps are generally sized so as to clamp a specific maximum diameter and are provided with adapters for reducing the diameter.

Each clamp is constituted by two jaws that are articulated at one end: one jaw is fixed to the frame while the other one is movable. A mechanical or hydraulic closure device is provided at the end that lies opposite the articulation end.

Those jaws form two concave mutually opposite portions that are substantially semicircular and form the seat for locking the corresponding pipe to be welded.

The adapters of the clamp consist of bodies that have a substantially semicircular contour and in practice form a C shape and are arranged and fixed within the complementarily shaped concave portion of a corresponding jaw.

Conventionally the adapters are made of cast aluminum.

The concave surface of the adapters which clamps the pipe generally has ridges provided transversely with respect to the directrix of the pipe in order to avoid any slippage.

The choice to make the adapters by cast aluminum arises from the need to achieve a final weight which is not excessive and is therefore practical for on-site ease of handling of the adapter combined with good structural strength.

In addition to the cost of aluminum as a raw material, there is a cost due to the work for finishing the adapters. The cost of this work is more or less onerous depending on the precisions of the mold used for casting.

For example, if one uses a sand mold, it is necessary to perform substantial reworking of the cast part in order to obtain a final product which has the intended dimensional and shape tolerances.

If, instead a pressure die-casting method is used, reworking is minimal, with a saving in finishing costs with respect to sand casting; however, die casting has the disadvantage of a considerable investment in terms of molds, that are much more expensive, because of the greater dimensional precision, than sand molds. If it is necessary to provide many types of reduction unit, the investment in molds becomes very onerous.

In recent years, the cost of aluminum as a raw material has been increasing constantly.

The overall costs for manufacturing aluminum adapters are therefore increasingly important also as a percentage on the total cost of a complete welding machine.

SUMMARY OF THE INVENTION

The aim of the present invention is to provide an adapter for pipe locking clamps, particularly but not exclusively useful in operations for welding pieces of plastic pipes by polyfusion of the head portion, which solves the problems described above.

Within this aim, an object of the present invention is to provide an adapter for pipe locking clamps which can be manufactured economically and is at the same time lightweight.

Another object of the present invention is to provide an adapter for pipe locking clamps which can be manufactured with low investments in machining equipment.

Another object of the present invention is to provide an adapter for pipe locking clamps which can be manufactured with known systems and technologies.

This aim and these and other objects, which will become better apparent hereinafter, are achieved by an adapter for clamps, particularly for welding plastic pipes, characterized in that it comprises at least two bodies that are obtained from a metal plate and are arranged parallel to each other, said at least two bodies having respective circular arc-like lateral rims that have a same radius of curvature, the centers of curvature of the circular arc-like lateral rims being all arranged on a same axis so as to form a discontinuous and partially cylindrical concave surface which is adapted to lock the pipes in cooperation with a similar surface formed on a complementary and opposite reduction unit.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 1 is a perspective view of a first embodiment of an adapter according to the invention;

FIG. 2 is an exploded perspective view of the adapter of FIG. 1;

DESCRIPTION OF THE PREFERRED EMBODIMENTS OF THE INVENTION

Figure 3:
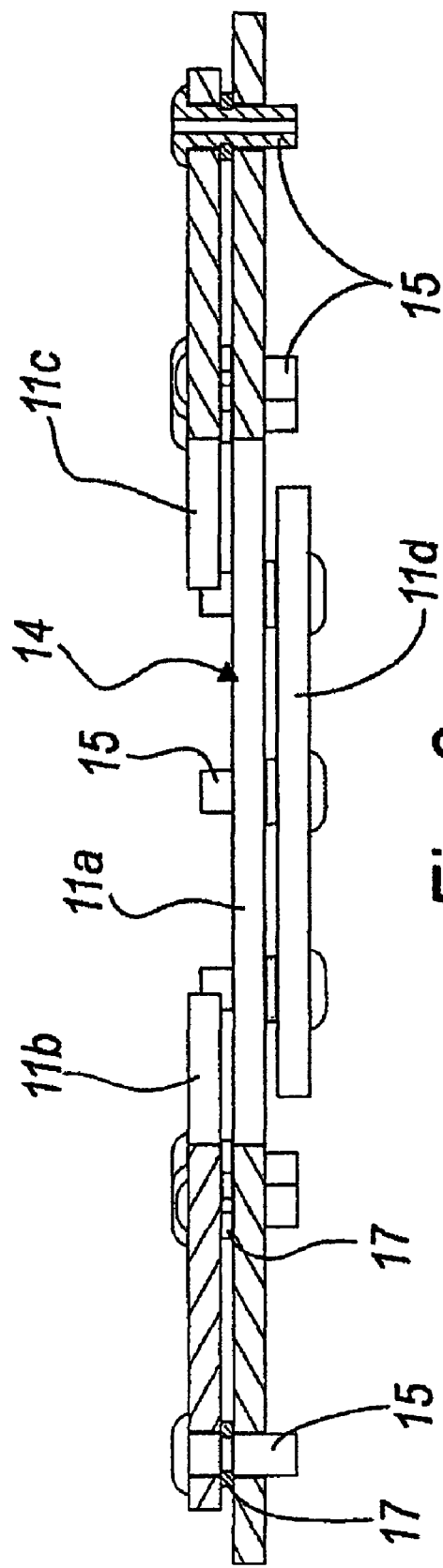
FIG. 3 is a sectional top view of the adapter of FIG. 1.

With reference to the figures cited above, a first embodiment of an adapter according to the invention is generally designated by the reference numeral 10.

The adapter 10 has four bodies 11a, 11b, 11c and 11d that are obtained from a metal plate, made for example of steel, and are mutually parallel. The bodies 11 are obtained from steel plates by laser cutting.

The four bodies 11 have respective circular arc-like lateral rims 12 that have a same radius of curvature. The four bodies 11 are mutually coupled so that the centers of curvature of the circular arc-like lateral rims 12 are all arranged on a same axis 13 so as to form in practice a partially cylindrical discontinuous concave surface 14 which locks the pipes in cooperation with a similar surface formed on a complementary and opposite adapter arranged on a jaw which lies opposite the one on which the adapter being described is arranged.

The bodies 11 are shaped like an annular sector.

In particular, in this embodiment, a first body 11a covers a wider circular arc than the other bodies 11b, 11c and 11d and is arranged centrally with respect to them. The first body 11a has a greater radial depth than the other three.

A second body 11b and a third body 11c are arranged at a face of the first body 11a, while the fourth body 11d is arranged at the opposite face.

The second and third bodies 11b and 11c are symmetrical with respect to an axis of symmetry of the first body 11a and are mutually separated by a space which is substantially equal to the lateral dimensions of the fourth body 11d. The fourth body is arranged on the opposite face, substantially at the projection of the space between the second and third bodies 11b and 11c.

The circular arc-like lateral rims 12 of the second, third and fourth bodies 11b, 11c, 11d are arranged in series so as to double the surface of the lateral rim of the first body 11a along the extension of the circular arc of the first body 11a, thus increasing the transverse locking surface of the pipe. The fourth body 11d is arranged on the face of the first body 11a that lies opposite the one on which the second and third bodies 11b and 11c are arranged, thus increasing the pipe locking surface also in the direction of the axis of the pipe.

The lateral rim 12 of the first body 11a is preferably equal to at least 40% of the outer circumference of the pipe to be locked.

The bodies 11b, 11c and 11d are fixed to the first body 11a by means of structural shear pins 15, which are arranged in through holes 16 formed in corresponding positions of the bodies.

As shown in the figures, the bodies 11b, 11c and 11d are spaced from the first body 11a by spacers 17, such as for example rings arranged on the pins 15.

As shown in the figures, the bodies 11 have through cutouts 18 that lighten the structure.

The first body 11a has a greater radial depth than the other three bodies 11b, 11c and 11d. The first body 11a therefore has a perimetric band 19 which protrudes with respect to the contour of the three bodies 11b, 11c and 11d in the opposite direction with respect to the circular arc-like lateral rims 12.

The perimetric band 19 is the portion for the insertion of the adapter within a slot which is formed in a corresponding jaw of the clamp to which the adapter is to be applied.

Figure 4:
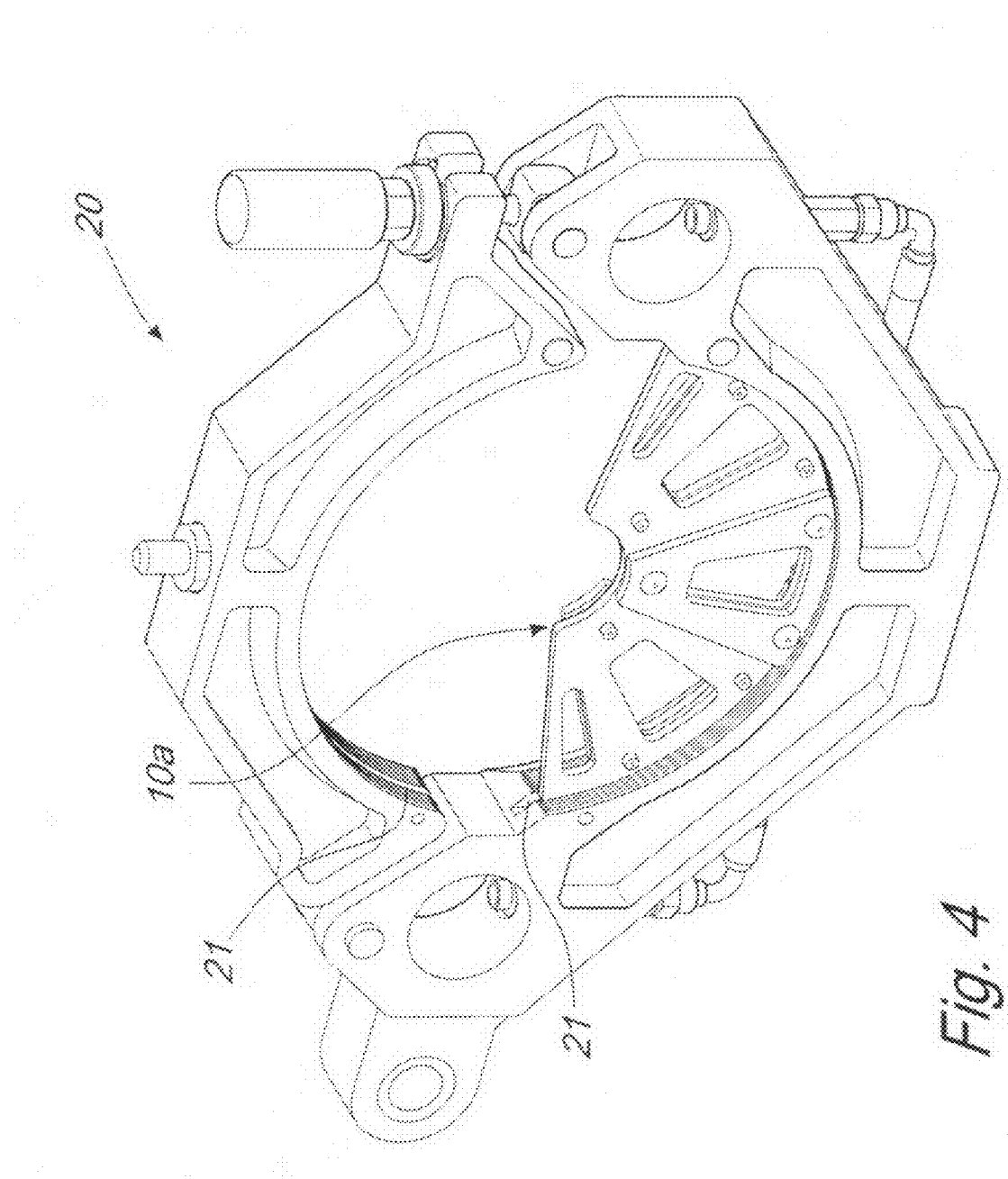
FIG. 4 is a perspective view of a pipe locking clamp in which an adapter according to the invention is applied to a single jaw and has a structure similar to the one of the preceding figures but with smaller reduction diameters.

FIG. 4 illustrates a clamp 20 provided with an adapter according to the invention, designated by the reference numeral 10a, having a structure which is similar to the one described above but has a reduced diameter adaptation. The slot for the insertion of the perimetric band 19 is designated by the reference numeral 21.

In particular, the outermost lateral rims of the three bodies 11b, 11c and 11d rest against the original surface of the clamp, thus ensuring greater stability of the reduction unit.

As described, the adapter 10 in practice has a partially cylindrical concave surface 14 which is formed by the surface of the circular arc-like rims 12 of the bodies 11.

The surface 14 is discontinuous, because the bodies 11 are mutually spaced; the edges of the circular arc-like rims 12 in practice act as ridges that increase the grip of the adapter on the pipe.

The particular arrangement of the bodies 11, wherein the first central body 11a has a larger angular extent, and the other bodies 11b, 11c, 11d are arranged alternately on the faces of the first body, allows to increase the grip surface on the pipe both transversely to the pipe and axially to the pipe.

The adapter is made of steel and therefore has excellent structural strength, but at the same time, since it is provided by laser cutting plates, has a lightweight structure, because the individual bodies have a reduced thickness and are lightened.

Figure 5:
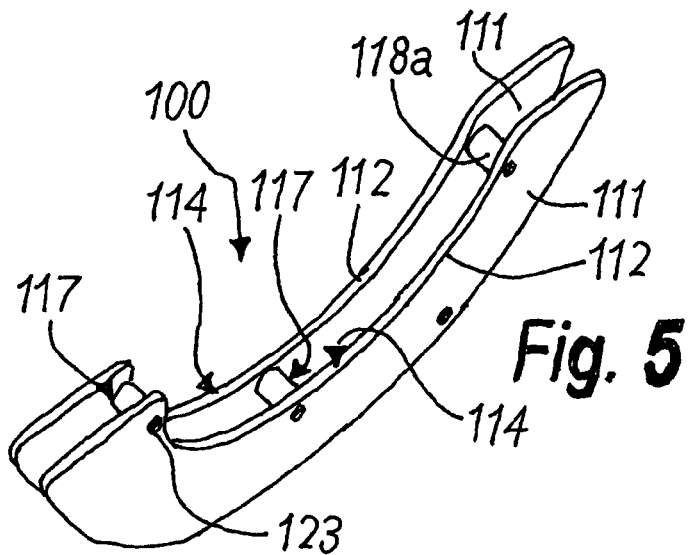
FIG. 5 is a perspective view of a second embodiment of an adapter according to the invention.
Figure 6:
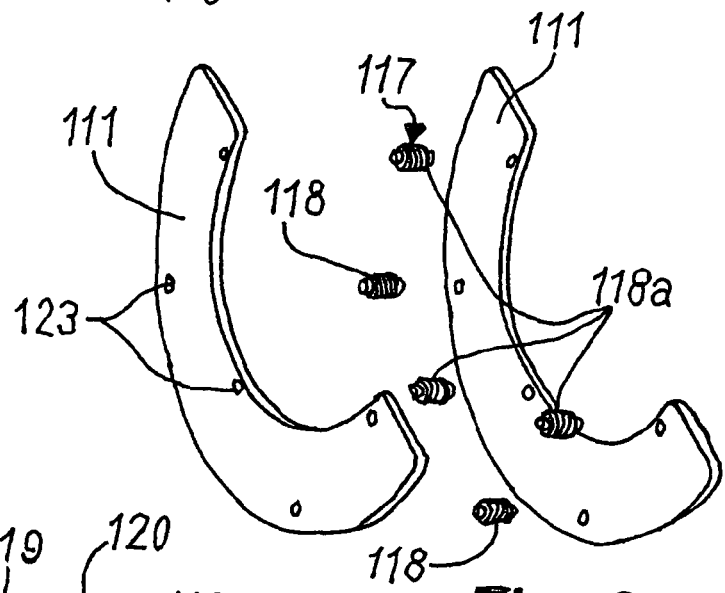
FIG. 6 is an exploded perspective view of the adapter of FIG. 5.
Figure 7:
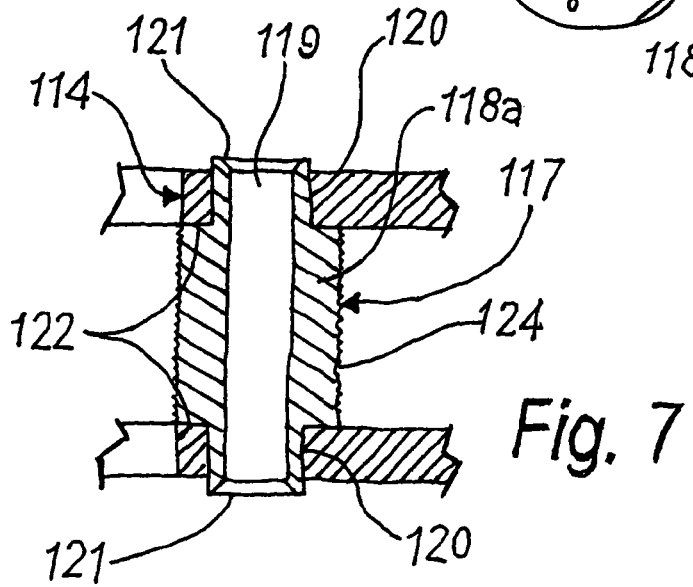
FIG. 7 is a sectional view of a detail of the adapter of FIG. 5.

FIGS. 5, 6 and 7 illustrate a second embodiment of an adapter according to the invention.

In this embodiment, the adapter, designated by the reference numeral 100, has two substantially identical bodies 111, obtained from a metal plate. The bodies are mutually parallel and are obtained from steel plates by laser cutting.

In this case also, according to the same inventive concept described above, the two bodies 111 have respective circular arc-like lateral rims 112 that have a same radius of curvature. The two bodies 111 are mutually coupled so that the centers of curvature of the circular arc-like lateral rims 112 are all arranged on a same axis so as to form a partially cylindrical concave surface 114, which is discontinuous and locks the pipes in cooperation with a similar surface formed on a complementary and opposite adapter arranged on a jaw which lies opposite the jaw on which the adapter being described is arranged.

The bodies 111 are shaped like an annular sector; the circular arc-like lateral rims 112 cover an extent of a circular arc which is preferably equal to at least 40% of the outer circumference of the pipe to be locked.

The bodies 111 are mutually fixed and spaced by means of spacers 117, each of which is constituted by a bush 118 which is provided axially with a through hole 119, which has, at its ends, annular recesses 120 that form respective pin portions 121 and shoulders 122.

Each pin portion 121 is inserted in a complementary through hole 123 which is formed in the corresponding body 111. The body abuts against the respective shoulder 122.

Each pin portion 121 is widened by means of punches in order to allow stable connection to the body 111. FIG. 7 shows the plastic deformation of the pin portion 121.

Of the bushes 118, three bushes 118a are arranged proximate to the circular arc-like lateral rims 112 of the bodies 111.

The lateral surface of each bush 118a comprised between the shoulders 122 has circumferential ridges 124 that are parallel to the curved extension of the bodies 111. The crests of the circumferential ridges 124 protrude, or at most are tangent, with respect to the partially cylindrical concave surface 114, thus facilitating the locking of the pipes.

In practice it has been found that the invention thus described solves the problems noted in conventional adapters for pipe locking clamps. In particular, the present invention provides an adapter for pipe locking clamps which has a lightened steel structure whose weight is comparable to that of monolithic adapters obtained from aluminum castings.

The production method also is extremely simple, consisting in laser-cutting steel plates in order to obtain locking bodies that are appropriately shaped like a circular arc and in connecting the bodies. Such method is quite more economical than the production of adapters obtained from monolithic castings.

This application claims the priority of Italian Patent Application No. PD2006A000254, filed on Jun. 20, 2006, the subject matter of which is incorporated herein by reference.

What is claimed is:

1. An adapter for clamps, particularly for welding plastic pipes, comprising at least four bodies in the form of respective metal plates arranged parallel to and laterally spaced from each other along an axis, said at least four bodies having respective circularly arcuate radially inner rims that have a same radius of curvature and centers of curvature arranged on said axis so as to form a discontinuous and partially cylindrical concave surface which is adapted to lock the pipes in cooperation with a similar surface formed on a complementary and opposite adapter, each of said at least four bodies being fixedly secured to another of said at least four bodies by a plurality of connector elements traversing the respective ones of said at least four bodies and extending parallel to said axis, said at least four bodies comprising at least a first body, a second body a third body and a fourth body, said first body extending along a larger circular arc than said second body and said third body, said second body and said third body being fixed at a face of said first body, said fourth body being arranged at the opposite face of said first body with respect to the face at which said second body mid said third body are fixed.

2. The adapter of claim 1, further comprising spacers for said at least four bodies in the direction of said axis.

3. The adapter of claim 1, wherein said at least four two bodies have the same thickness.

4. The adapter of claim 1, wherein said at least four bodies are each in the form of an annular sector.

5. The adapter of claim 1, wherein said at least four bodies are made by cutting metal plates by means of a laser.

6. The adapter of claim 1, wherein said connector elements are structural shear pins arranged in through holes formed in corresponding portions of said at least four bodies.

7. The adapter of claim 6, further comprising spacers constituted by rings arranged on said pins.

8. The adapter of claim 1, wherein said at least four bodies have through cutouts for lightening.

9. The adapter of claim 1, wherein said first body has a greater radial depth than the other bodies.

10. The adapter of claim 1, wherein said axis is a longitudinal axis and wherein, said first body is symmetrical with respect to a central axis, said second and third bodies being symmetrical with respect to said central axis of said first body and being angularly spaced from one another by an angle substantially equal to an arc length of said fourth body about said longitudinal axis, said fourth body being arranged in the space between said second and third bodies.

11. The adapter of claim 10, wherein said second, third and fourth bodies are fixed to said first body by means of structural shear pins arranged in through holes provided in corresponding positions of said bodies.

12. The adapter of claim 11, herein said first body has a perimetric band which protrudes radially outwardly with respect to an outer contour of said second, third and fourth bodies on a side thereof opposite said inner rims, said perimetric band being suitable for insertion within a slot which is formed in a corresponding jaw of the clamp to which said adapter is to be applied.

13. The adapter of claim 1, wherein the inner rims of said second body and said third body have lengths that are substantially identical.

14. The adapter of claim 13, wherein said second body and said third body are substantially mutually identical bodies.

* * * * *